Dec. 13, 1938.  W. A. BILGER ET AL  2,140,068
GROOVED PULLEY
Filed May 1, 1937
FIG. I.
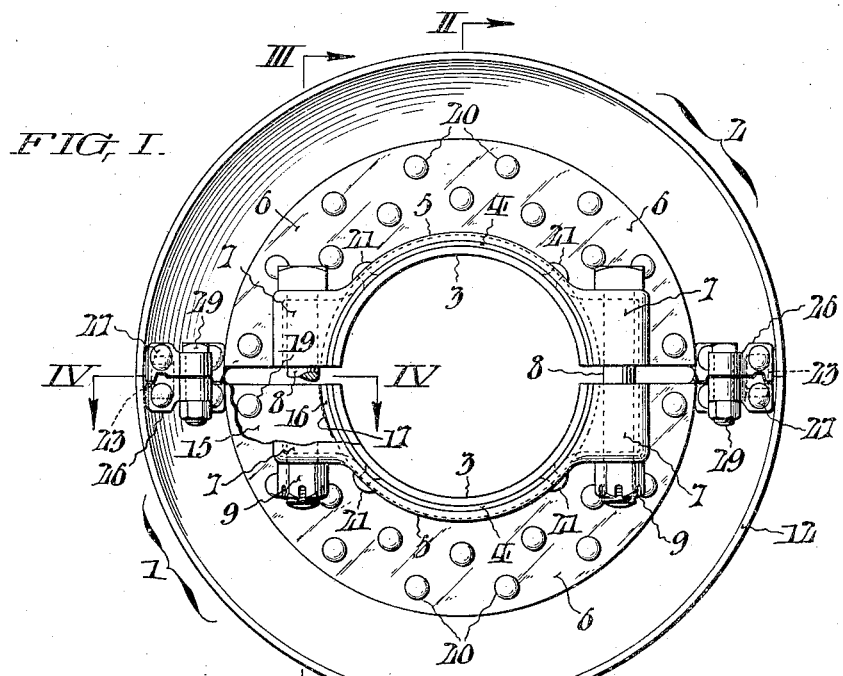
FIG. III.
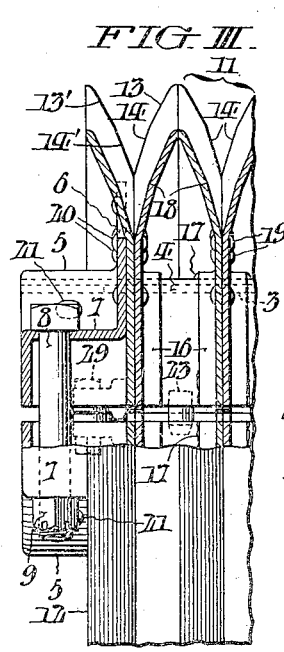
FIG. II.
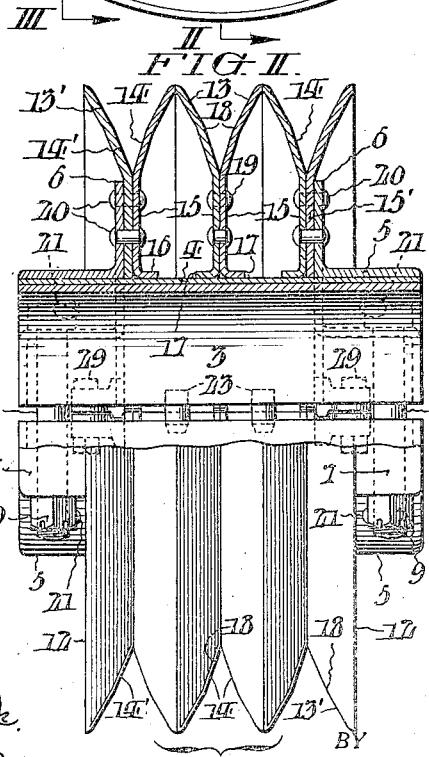
FIG. IV.
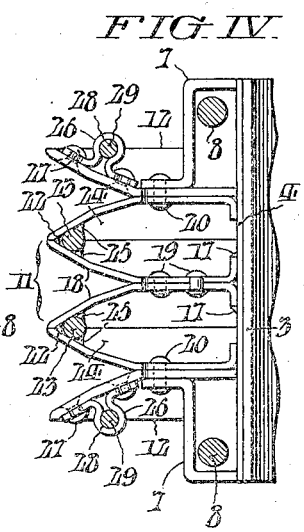
WITNESSES:
Thomas W. Kerr, Jr.
William Bell, Jr.
INVENTORS:
Walter A. Bilger &
David M. Watson,
Fraley Paul
ATTORNEYS.

Patented Dec. 13, 1938

2,140,068

UNITED STATES PATENT OFFICE 2,140,068

GROOVED PULLEY

Walter A. Bilger, Philadelphia, and David M. Watson, Ardsley, Pa., assignors to The American Pulley Company, Philadelphia, Pa., a corporation of Pennsylvania Application May 1, 1937, Serial No. 140,146

2 Claims. (Cl. 74—230.8)

This invention relates to the construction of grooved pulleys and, more particularly, to the type built-up of discous elements juxtapositioned upon, and secured to, an appropriate hub for attachment to shafts and the like.

The primary object of the present invention is to provide a multi-groove V-belt split pulley preferably designed for application to the truck axles of railroad cars for driving lighting generators and other units.

Another object is to provide a pulley of the type indicated, constructed wholly of sheet metal parts or elements with the exception of certain connector and securing means.

Other objects are to enable construction of pulleys of the specified character including component parts of a minimum number and type capable of being assembled with ease and rapidity; and, in general, to ensure the advantages of lightness and economy without loss of the requisite strength and stability necessary to withstand hard usage in continuous service.

With the foregoing objects in view, this invention consists in the novel components, combinations of means, and arrangements of parts hereinafter disclosed, illustrated in the drawing, and more concisely expressed in the claims at the conclusion of this specification.

In the drawing:

Fig. I is a face view of a multi-groove V-belt split pulley embodying the present improvements.

Fig. II is a diametric section on the plane II—II of Fig. I.

Fig. III is a part section and part edge view, taken approximately as designated by the arrows III—III in Fig. I; and, Fig. IV is a fragmentary detail view on the plane IV—IV of Fig. I.

In all the views, corresponding parts are indicated by like reference characters.

Referring more in detail to the drawing, it will be observed that the form of pulley illustrated is of the split type, comprising diametrically separate semi-circular units 1, 2. These units 1, 2 being opposing-halves and complemental in construction, the following description will be confined to the singular in order to obviate unnecessary repetitive matter.

Each unit 1, 2, conveniently, although not essentially, comprises an inner liner 3 of arcuate or approximate semi-circular cross-section, an outer body member or shell 4 of corresponding cross-section, and end components 5 embodying abutment flanges 6, for a purpose hereafter explained, with opposing offsets 7, suitably apertured at 8 for passage of clamp bolts 9 having castle nuts 10 whereby the split pulley is attached to a mounting shaft, not shown, in an obvious manner.

The grooved perimeter of the pulley 1, 2 is composed of abutting pairs of complemental dished disks 11 in alternately reversed relation, and end disks 12 of slightly different diametric section. Each dished disk 11 is of annular formation and embodies outer and adjoining inner differentially-inclined surfaces 13, 14, respectively, for joint formation of the opposing walls of the pulley grooves; a web portion 15 for abutment with the juxtapositioned disk 11, and an inner somewhat tubulate flange 16 for engagement on the outer body member or shell 4 and permanent fixture thereto by "tack" welds 17, in accordance with known practice. The end disks 12 differ only from the complemental disks 11 by omission of the tubulate flanges 16, and accordingly corresponding references are applied with an added "prime" exponent, in order to obviate the necessity for repetitive explanation. It is to be noted, however, that the differentially-inclined disk portions 13, 14, 13', 14', jointly combine to provide grooves of a cross-section including opposing ridges 18 adapted to more effectively grip and prevent circumferential, as well as radial, slippage of the conventional V-belts usually driven by pulleys of the type herein disclosed. Attention is also directed to the fact that the peripheral engaging edges of the disks 11 are made an exact fit so as to ensure positively-tight joints thereat.

To build up a split-pulley of the type described, a central pair of complemental disks 11 are permanently connected together by suitable welds or circumferentially-spaced series of rivets 19, passed through registering holes in their abutting web portions 15. The thus united disks 11 are applied to the body member or hub-shell 4 in the desired position, whereupon said parts are permanently connected together by the "tack" welds 17. Other disks 11, 12 are next placed in opposing relation with their web portions 15, 15' in abutment against the flange 6 of an end component 5, and then permanently secured together by welds or by rivets 20, as just described in connection with the first mentioned or central disks 11; whereupon the united parts 11, 12 and 5 are applied to the body member or shell 4, and the parts thus assembled are rigidly connected by welds or rivets 21, as well as peripheral welds 22, in an obvious manner. Each such split or half-pulley so constructed may have a liner 3 inserted in the shell 4, and "tack" welded thereto, while it is further provided at one side with dowels 23 preferably secured in the peripheral hollows 24 between juxtapositioned disks 11, as by welds 25, said dowels having their projecting ends adapted to snugly engage the confronting peripheral hollows 24 of the pulley other half-portion; all of which will be readily understood from an examination of the drawing, without extended elaboration herein. In addition, each end disk 12 is provided proximate its peripheral outer edge with means to maintain the respective groove disc halves 1, 2 in common rotative planes. Such means preferably comprise mating elements 26 conveniently attached to the pulley end disks 12 by rivets 27 and affording registrable sockets 28 for aligning bolts 29.

Obviously liners 3 of different thickness may be fitted in the shell or hub members 4 for adaptation of the improved pulley to shafts of various diameters, or such liners may be dispensed with.

From the foregoing description it will be apparent that by this invention there is provided a relatively light weight yet exceptionally sturdy multi-grooved pulley preferably composed of sheet steel parts, that is simple in design and easily produced by die-stamping, said parts being also assembled and connected together with a minimum expenditure of time and labor.

Having thus described our invention, we claim:

1. In a multi-groove split-pulley, the combination of substantially semi-circular sheet metal units, each such unit including abutted inner dished components having tubulate hub-engageable flanges arranged in alternately-reversed relation, substantially conformative plain web outer components jointly forming the multi-grooves, said inner and outer component groove walls each embodying confronting annular sections of differential-inclination to define inwardly-directed belt gripping ridges, associated end components with abutment flanges between which the inner and outer groove-forming components are disposed, means rigidly securing the inner components in juxtapositioned pairs, means similarly securing the outer groove-forming components to the end component abutment flanges, a semi-tubular member to which the components aforesaid are permanently attached, means in the angular hollows defined by the abutting peripheral portions of the alternatingly-reversed components, at one side of each unit, for engagement in the opposing hollows of the other component, mating elements forming registrable sockets proximate the peripheral edges of each outer dished component, and means engaging the sockets whereby said outer components are planarly aligned.

2. A multi-groove pulley, as defined in claim 1, wherein each end component embodies a hub portion with a circumferential flange, conformative to the confronting dished unit web portion, and opposing apertured offsets for passage of suitable means for attaching the pulley units to a mounting shaft.

WALTER A. BILGER.
DAVID M. WATSON.